(12) United States Patent
Hanif et al.

(10) Patent No.: US 7,783,321 B2
(45) Date of Patent: Aug. 24, 2010

(54) CELL PHONE DEVICE

(75) Inventors: Sadeque Mohammad Hanif, Tokyo (JP); Ehsan Ui Islam, Tokyo (JP); Masanori Tokunaga, Funabashi (JP)

(73) Assignee: Freescale Semiconductor, Inc., Austin, TX (US)

( * ) Notice: Subject to any disclaimer, the term of this patent is extended or adjusted under 35 U.S.C. 154(b) by 733 days.

(21) Appl. No.: 11/609,077

(22) Filed: Dec. 11, 2006

(65) Prior Publication Data
US 2007/0135182 A1    Jun. 14, 2007

(30) Foreign Application Priority Data
Dec. 9, 2005    (JP)    ............... 2005-355816

(51) Int. Cl.
*H04M 1/00*    (2006.01)
(52) U.S. Cl. ............... 455/550.1; 455/573; 455/556.1; 455/575.1
(58) Field of Classification Search ............... 455/550.1, 455/573, 556.1
See application file for complete search history.

(56) References Cited

U.S. PATENT DOCUMENTS

| | | | | |
|---|---|---|---|---|
| 4,992,720 A | * | 2/1991 | Hata ........................ | 320/133 |
| 5,005,198 A | * | 4/1991 | Toda ........................ | 455/573 |
| 5,584,070 A | * | 12/1996 | Harris et al. ............... | 340/7.54 |
| 6,115,618 A | * | 9/2000 | Lebby et al. ............... | 455/566 |
| 6,225,780 B1 | * | 5/2001 | Koch ........................ | 320/118 |
| 6,643,527 B2 | * | 11/2003 | Satoh et al. ................ | 455/574 |
| 6,735,455 B2 | * | 5/2004 | Naito et al. ................ | 455/574 |
| 6,792,297 B2 | * | 9/2004 | Cannon et al. ............. | 455/573 |
| 6,795,715 B1 | * | 9/2004 | Kubo et al. ............... | 455/556.1 |
| 7,133,703 B2 | * | 11/2006 | Aoshima et al. ............ | 455/574 |
| 7,388,351 B2 | * | 6/2008 | Yudahira ................... | 320/119 |
| 7,471,890 B2 | * | 12/2008 | Lee et al. .................. | 396/287 |
| 7,496,386 B2 | * | 2/2009 | Liu et al. .................. | 455/573 |
| 2002/0051060 A1 | * | 5/2002 | Wada ........................ | 348/207 |
| 2003/0050102 A1 | * | 3/2003 | Roh ........................... | 455/573 |
| 2004/0185913 A1 | * | 9/2004 | Aoshima et al. ............ | 455/566 |
| 2005/0124381 A1 | * | 6/2005 | Kim et al. ................. | 455/556.1 |
| 2005/0140778 A1 | | 6/2005 | Kim et al. | |
| 2005/0186996 A1 | | 8/2005 | Pan | |
| 2005/0189921 A1 | * | 9/2005 | Bayne et al. ............... | 320/138 |
| 2006/0135218 A1 | * | 6/2006 | Son et al. .................. | 455/573 |

FOREIGN PATENT DOCUMENTS

| | | |
|---|---|---|
| JP | 2002-152696 | 5/2002 |
| JP | 2002-237880 | 8/2002 |
| JP | 2004-336231 | 11/2004 |

* cited by examiner

*Primary Examiner*—Lewis G West
*Assistant Examiner*—Qun Shen
(74) *Attorney, Agent, or Firm*—Charles Bergere

(57) ABSTRACT

A cell phone device having a camera, an imaging unit and a display unit, which are joined with each other. The imaging unit and the display unit may be separated and used in a separated state. A display housing includes the display unit, a speaker, and a microphone. A keypad housing includes the imaging unit. The display housing and the keypad housing each include a local communication IF unit for performing wireless communication and a battery for supplying power to each function block. When the display housing and the keypad housing are separated, the image generated by the imaging unit is output to the display unit via the local communication IF units. A recording instruction is then generated by operating the display housing while checking the image on the display unit.

4 Claims, 3 Drawing Sheets

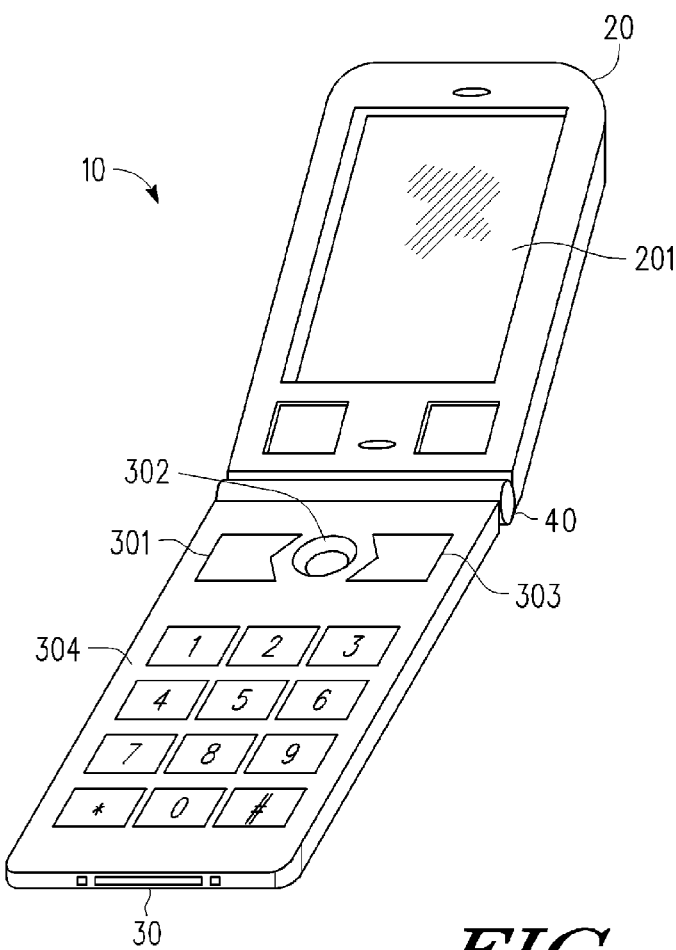
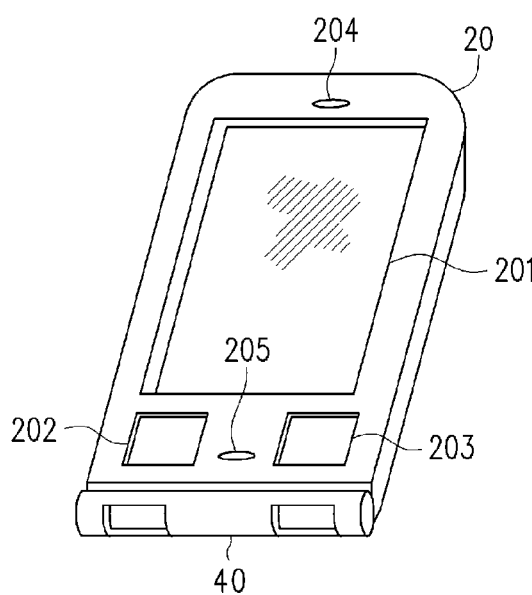
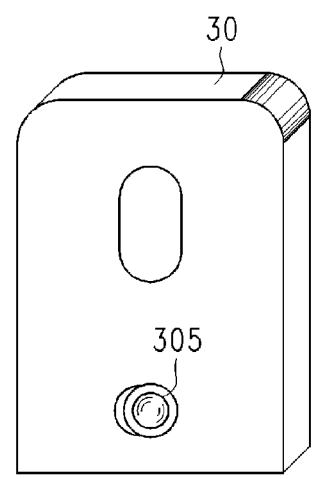
FIG. 1
FIG. 2A
FIG. 2B

CELL PHONE DEVICE

BACKGROUND OF THE INVENTION

The present invention relates to cell phone devices, and more particularly, to a cell phone device including a display unit and an imaging unit that are separable.

Many types of cell phone devices are now equipped with cameras. Such a cell phone device equipped with a camera includes an imaging unit and a display unit. A picture may be taken while checking the image of the picture on the display unit.

There are many types of flip cell phone devices in which the display unit and the keypad unit are separate from each other but connected via a hinge. The flip-type cell phone device is folded to make it compact. Further, when phone calls are made with the flip-type cell phone device, the transmitter (microphone) and the receiver (speaker) are spaced from each other and respectively conform to the locations of the ear and the mouth. Thus, privacy is maintained during phone calls. The display unit and the keypad unit, which are formed in two separate housings, are physically connected to each other. Further, data is passed between the display unit and the keypad unit with wires.

In a cell phone equipped with a camera, an imaging unit is arranged on the rear surface of the display unit since pictures are normally taken while viewing the display.

A cell phone device in which the display unit and the keypad unit are separable has been proposed (see e.g., US Patent Application No. 2005/0124381 (FIG. 1)). This cell phone device includes two separable housings, a first housing and a second housing. The first housing includes a camera unit (imaging unit), a display unit, a first voice output unit (speaker), a first information input unit (operation buttons), and a wireless communication unit. The second housing includes a second information input unit (operation buttons), a voice input unit (microphone), a second voice output unit (speaker), and a wireless communication unit. By sliding the second housing along the first housing, the first and second housings may be joined with each other. Wireless communication is performed when the first and second housings are separated from each other.

By arranging the camera section and the display unit on the first housing, the user may image him or herself with the camera unit while viewing the recipient on the display unit. Furthermore, the microphone and the speaker of the second housing may be used to speak with the recipient. Thus, this cell phone device has a video phone function that is realized while maintaining portability.

The freedom of operation for the camera is low in an all-in-one cell phone device and a flip-type cell phone device. In a cell phone device having the imaging unit arranged at the rear side of the display unit, it may not be possible to check the imaging state with the display unit. For example, when a user is taking a picture of him or herself, the imaging state cannot be checked since the display unit is located on the rear surface.

The cell phone device described in US Patent Application Publication 2005/0124381 is suitable for video conferences, in which imaging is performed at close range, since the camera unit and the display unit are housed in a single housing. However, the imaging state cannot be checked on the display unit if the camera unit is arranged at a distant location. For example, when a user images the entire body of him or herself or when two or more people are imaged, the camera section must be separated from the body or bodies as far as possible. In such a case, it becomes difficult to pose in front of the camera unit. Further, the display unit would become distant and make it difficult to check the image with the display unit. Therefore, in such a cell phone device, there are restrictions to the operations that can be performed with the camera unit and the display unit. Thus, such a cell phone device is suitable only when taking normal pictures.

Power is also required to realize the basic telephone functions of the cell phone device, the imaging function of the imaging unit, and the display function of the display unit. Some of these functions may become unusable if power control is not appropriately performed.

SUMMARY OF THE INVENTION

The present invention provides a versatile cell phone having a digital camera function enabling easy operation.

One aspect of the present invention is a cell phone device including a first housing and a second housing separable from the first housing. The first housing includes a display means, an imaging operation means, a first local communication means, and a first control means. The second housing includes an imaging means, a second local communication means, and a second control means. The second control means transmits image data generated by the imaging means to the first location communication means via the second local communication means and outputs the image to the display means. The first control means records the image data generated by the imaging means based on an imaging instruction input to the imaging operation means.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a perspective view showing a cell phone device according to a preferred embodiment of the present invention;

FIG. 2A is a perspective view showing a display housing of the cell phone device;

FIG. 2B is a perspective view showing a pad housing of the cell phone device;

DETAILED DESCRIPTION OF THE PREFERRED EMBODIMENTS

Figure 3:
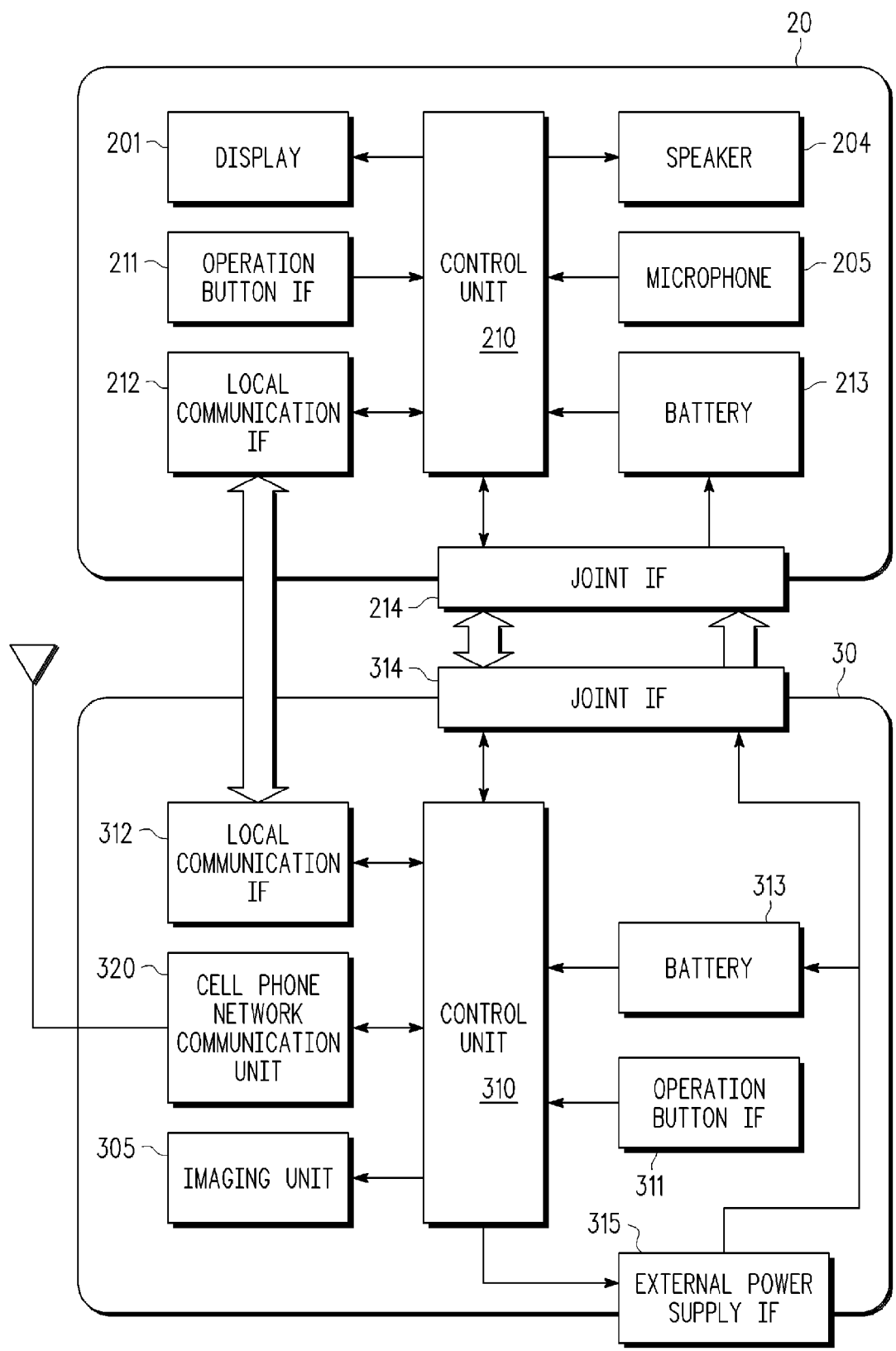
FIG. 3 is a block diagram showing the functions of the cell phone device.

A preferred embodiment of the present invention will now be described using the drawings. FIG. 1 is a perspective view showing a cell phone device 10 of the present embodiment. The cell phone device 10 of the present embodiment includes a display housing 20 serving as a first housing, a keypad housing 30 serving as a second housing, and a joint 40.

The display housing 20 includes a display unit 201 serving as a display means. The display unit 201 is formed by a liquid crystal display or the like.

The keypad housing 30 includes a first operation button 301, a second operation button 303, and a selector operation button 302.

Icons displayed in a guide line at the left end of the display unit 201 are selected with the first operation button 301. The icons displayed in the guide line at the right end of the display unit 201 are selected with the second operation button 303.

The selector operation button 302 is used to move a cursor shown on the display unit 201 to select the icon to which the cursor is pointed.

The keypad housing 30 further includes dial buttons 304 to which a number of characters are allocated. The dial buttons 304 are used to input the associated number or character.

In addition to the display unit 201, as shown in FIG. 2A, the display housing 20 includes a first operation button 202 and a second operation button 203.

The first operation button 202 is used to control the activation of a view finder output to the display unit 201. Power consumption is lowered when the view finder is inactivated.

The second operation button 203 functions as an imaging operation means and is used to perform imaging. When the second operation button 203 is pushed to input an imaging instruction, a recording instruction is sent to the keypad housing 30.

Furthermore, the display housing 20 includes a speaker 204 serving as a voice output means and a microphone 205 serving as a voice input means. When receiving a phone call with the cell phone device 10, conversations are carried out through the speaker 204 and the microphone 205.

The display housing 20 and the pad housing 30 are connected by the joint 40.

In the cell phone device 10 of the present embodiment, an imaging unit 305 serving as an imaging means is arranged on the surface opposite the pad surface of the pad housing 30 that includes the dial buttons 304, as shown in FIG. 2B. The imaging unit 305 is formed by a CCD camera or the like.

The function blocks of the cell phone device 10 of the present embodiment will now be described with reference to FIG. 3. In the cell phone device 10, the display housing 20 and the keypad housing 30 are separable.

The display housing 20 includes a control unit 210 serving as a first control means for controlling the display unit 201, the speaker 204, and the microphone 205. The control unit 210 receives various inputs of the first operation button 202 and the second operation button 203 through an operation button IF unit 211.

The control unit 210 is connected to a local communication IF unit 212 serving as a first local communication means. The local communication IF unit 212 is a communication interface used for wireless communication with the pad housing 30. UWB (Ultra Wide Band), ZigBee (registered trademark) which is a short distance wireless communication standard designed for household electronics, and Bluetooth (registered trademark) which is a wireless communication technique designed for portable information device, can be used for communication.

The display housing 20 includes a battery 213 serving as a first battery for supplying power to each of the function blocks. The battery 213 is charged by the power supplied through a joint IF unit 214 when the display housing 20 and the pad housing 30 are connected by the joint 40.

The keypad housing 30 also includes a control unit 310 serving as a second control means for controlling the imaging unit 305. The control unit 310 receives various inputs from the first operation button 301, the second operation button 303, the selector operation button 302, and the dial buttons 304 through an operation button IF unit 311.

The control unit 310 is further connected to a local communication IF unit 312 serving as a second local communication means. The local communication IF unit 312 is a communication interface used for wireless communication with the local communication IF unit 212 of the display housing 20. The local communication IF unit 312 uses the same communication technique as that used by the local communication IF unit 212. When the display housing 20 and the keypad housing 30 are connected by the joint 40, the control unit 210 and the control unit 310 transmit and receive various signals through the joint IF units 214 and 314.

The keypad housing 30 further includes a cell phone network communication unit 320 serving as a public network communication means for performing wireless communication with a base station of a communication carrier. The telephone function of the cell phone device 10 is realized by the cell phone network communication unit 320.

The control unit 310 of the pad housing 30 includes a data storage means for storing image data. When receiving a recording instruction, the control unit 310 records the image data acquired by the imaging unit 305 in the data storage means.

The keypad housing 30 further includes a battery 313 serving as a second battery for supplying power to each function block. The battery 313 is charged by the power externally supplied from an external power supply IF unit 315. The external power supply IF unit 315 supplies power to the joint IF unit 314 based on the control of the control unit 310. The power is further supplied to the battery 213 via the joint IF unit 214. The batteries 213 and 313 that are used have battery capacities that provide the same duration when separated during normal use.

[Battery Management]

Figure 4:
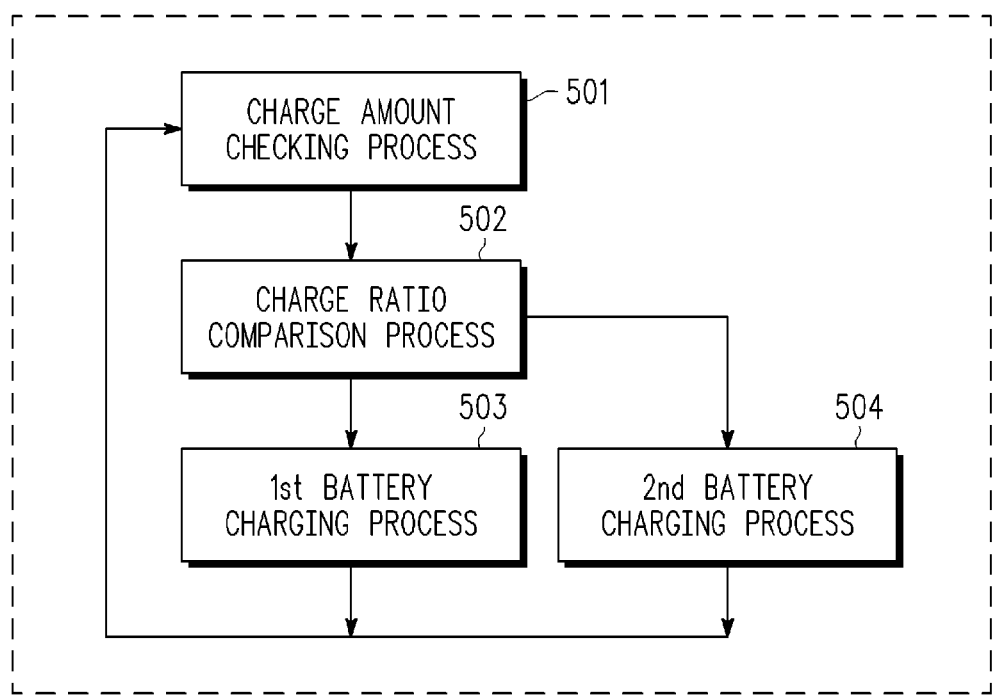
FIG. 4 is a flowchart showing a charging process.

A battery management process for charging the cell phone device 10 will now be described with reference to FIG. 4. When charging is performed, the charging amount is distributed between the battery 313 and the battery 213. Specifically, power is distributed so that the battery 313 and the battery 213 have the same duration when the display housing 20 and the keypad housing 30 are separated.

When charging is performed, the display housing 20 and the keypad housing 30 are connected by the joint 40. This connects the control units 210 and 310 and the batteries 213 and 313. The external power supply IF unit 315 is connected to an external power supply.

The cell phone device 10 executes a charge amount checking process (step 501). Specifically, each of the control units 210 and 310 checks the charge amount of the associated battery 213 and 313 supplied with power. The charge amount is calculated from, for example, an output voltage value.

The cell phone device 10 then executes a charge ratio comparison process (step 502). In the present embodiment, the control unit 310 executes the charge ratio comparison process. The control unit 210 provides the control unit 310 with a signal related to the charge amount of the battery 213. The control unit 310 then compares the acquired charge amount of the battery 213 and the charge amount of the battery 313.

The cell phone device 10 charges the first battery or the second battery based on the comparison of the charge amounts. Specifically, the ratio (charge ratio) of the present charge amount with respect to the charge amount in a fully charged state is calculated, and the battery with the lower charge ratio is given priority for charging. For example, if the charge ratio of the battery 213 serving as the first battery is low, priority is given to the charging of the battery 213, which is performed for a predetermined time by the external power supply IF unit 315 (step 503). If the charge ratio of the battery 313 serving as the second battery is low, priority is given to the charging of the battery 313, which is performed by the external power supply IF unit 315 (step 504).

After a predetermined time elapses, the charge amount checking process (step 501) and the charge ratio comparison process (step 502) are again executed. Then, the charging process of the first battery or the second battery is executed based on the comparison result (steps 503, 504).

When the charging of the first and second batteries is completed (fully charged state) in the charge amount checking process (step 501), an instruction for stopping the charging process is sent to the external power supply IF unit 315. This ends the charging of the batteries.

The cell phone device 10 executes the battery management even when the external power is not supplied. In other words, when the display housing 20 and the keypad housing 30 are connected by the joint 40, the accumulated electric power is distributed so that the battery 213 and the battery 313 have the same charge ratio. Specifically, the cell phone device 10 executes the charge amount checking process (step 501) and the charge ratio comparison process (step 502). Power is then supplied from the battery having the higher charge ratio to the battery having the lower charge ratio. Thus, if the charge ratio of the first battery is low, the charging is performed from the second battery to the first battery. If the charge ratio of the second battery is low, the charging is performed from the first battery to the second battery. This keeps the charge ratios of the two batteries equal.

(Imaging Mode)

A process for performing imaging with the cell phone device 10 will now be described. Imaging is performed in a connected imaging mode, in which the display housing 20 and the keypad housing 30 are connected state by the joint 40, and a separated imaging mode, in which the display housing 20 and the keypad housing 30 are separated. In the connected imaging mode, the control unit 210 and the control unit 310 exchange signals through the electrical connection of the joint IF units 214 and 314. In this case, when the second operation button 203 is pushed, the control unit 210 provides the control unit 310 with an instruction for performing recording with the imaging unit 305.

In the separated imaging mode, the control unit 210 and the control unit 310 exchange signals through wireless communication via the local communication IF units 212 and 312. For example, the image data acquired by the imaging unit 305 is provided from the control unit 310 to the control unit 210 via the local communication IF units (212, 312). The control unit 210 then displays the image on the display unit 201. When the second operation button 203 is pushed to input an imaging instruction, the control unit 210 provides the control unit 310 with an instruction for performing recording with the imaging unit 305. The recording instruction may also be provided through wireless communication via the local communication IF units (212, 312).

(Telephone Conversation Mode)

A process for conducting a telephone conversation with the cell phone device 10 will now be described. The display housing 20 and the keypad housing 30 must be connected by the joint 40 to make a call with the cell phone device 10. A telephone number is input by operating the dial buttons 304 on the keypad housing 30. Then, the cell phone network communication unit 320 establishes connection with a base station of the communication carrier. When an incoming call is made via the base station, the call is received by the cell phone network communication unit 320.

When the display housing 20 and the keypad housing 30 are separated only incoming calls are processed. Specifically, the control unit 310 receives a call from the base station of the communication carrier with the cell phone network communication unit 320 and transfers the incoming call to the display housing 20 via the local communication IF units 212 and 312. When the control unit 210 receives the transferred call, the speaker 204 and the microphone 205 of the display housing 20 are used to carry out telephone conversations.

The present embodiment has the advantages described below.

Figure 5:
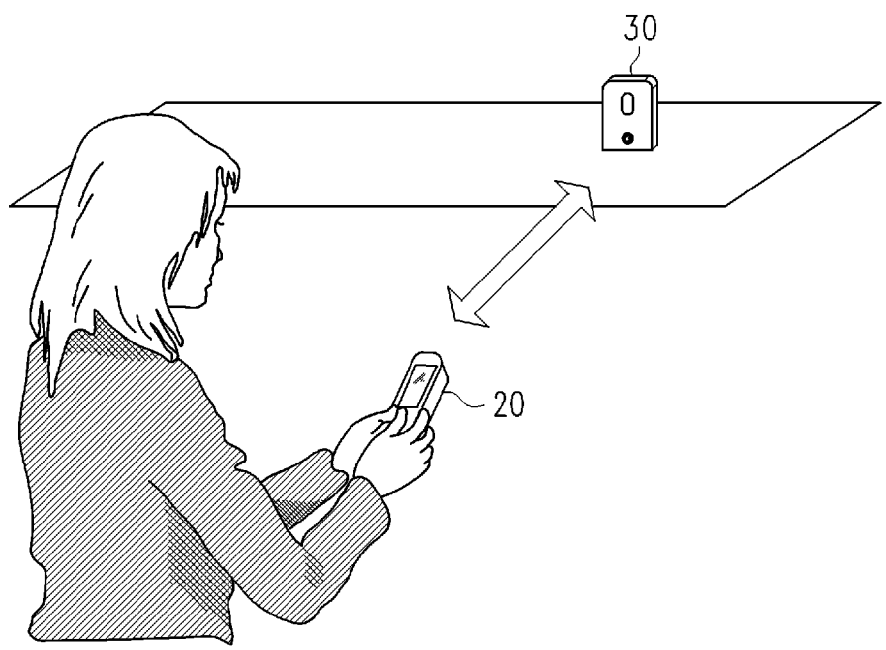
FIG. 5 is a schematic view showing the usage of the cell phone device.

In the above embodiment, the display housing 20 and the keypad housing 30 of the cell phone device 10 are separable. The display unit 201 is arranged on the display housing 20, and the imaging unit 305 is arranged on the keypad housing 30. The display housing 20 may thus be used like a remote controller for a digital camera. Therefore, pictures may be taken from a distant location by arranging the keypad housing 30, which includes the imaging unit 305, at a certain position (for example, on a stand), as shown in FIG. 5, such as when the user takes a picture of him or herself or when the user takes a picture of two or more people including him or herself.

In the above embodiment, the image data acquired by the imaging unit 305 of the cell phone device 10 is provided to the control unit 210 by the control unit 310 via the local communication IF units 212 and 312 and shown on the display unit 201. Thus, the user may check his or her face and pose with the display unit 201 he or she is holding.

In the above embodiment, the cell phone network communication unit 320 is arranged on the keypad housing 30 of the cell phone device 10. If an incoming call is received when the display housing 20 and the keypad housing 30 are separated, the cell phone network communication unit 320 of the keypad housing 30 receives the call from the base station. The control unit 310 then transfers the incoming call to the display housing 20 via the local communication IF units 212 and 312. The speaker 204 and the microphone 205 of the display housing 20 are then used to carry out a telephone conversation. Furthermore, even when the user is at a location where wireless communication with the cell phone is difficult, the communication carrier establishes connection with the keypad housing 30 and transfers calls to the display housing 20 through local communication.

In the above embodiment, the batteries 213 and 313 are separately arranged in the display housing 20 and the pad housing 30. Thus, the housings 20 and 30 are separately driven even if the keypad housing 30, which includes the imaging unit 305, and the display housing 20 are separated. Furthermore, when charging the cell phone device 10, the cell phone device 10 executes the charge amount checking process (step 501) and the charge ratio comparison process (step 502). Then, the cell phone device 10 executes the charging processes of the first battery or the second battery based on the comparison result. Thus, if the level of drainage is higher in one of the batteries, priority is given to that battery during charging. This prevents a state in which only one of the batteries is drained.

When external charging is not performed, the accumulated power is distributed so that the batteries 213 and 313 have the same charge ratio when the display housing 20 and the keypad housing 30 are connected by the joint 40. This balances power distribution. In other words, if the batteries do not have the same charge amount, the charge amount of each battery is corrected so that the display housing 20 and the keypad housing 30 function efficiently.

In the above the embodiment, the first operation button 202 on the display housing 20 of the cell phone device 10 is used to control the activation and inactivation of the view finder output to the display unit 201. Thus, power consumption may be lowered by inactivating the view finder.

It should be apparent to those skilled in the art that the present invention may be embodied in many other specific forms without departing from the spirit or scope of the invention. Particularly, it should be understood that the present invention may be embodied in the following forms.

In the above embodiment, imaging is performed in a state in which the display housing 20 and the keypad housing 30 of the cell phone device 10 are separated. The imaging function of the cell phone device 10 is not limited to taking pictures and may be used as a monitor camera for checking on guests. For example, the imaging unit 305 of the pad housing 30 may be arranged in a view port of a door when resting in a bedroom or working in a kitchen, and the display housing 20 may be kept near the user. If a guest rings the door bell, the user may check on the guest by pushing the first operation button 202 to activate the view finder without going to the door. Furthermore, a picture of the guest may be taken if necessary. In addition to being used with a door, the cell phone device 10 may be used to monitor the state of the first floor when the user is on the second floor. The cell phone device 10 may also be used as a security camera.

In the above embodiment, a telephone conversation is carried out using the speaker 204 and the microphone 205 of the display housing 20. In addition, the keypad housing 30 may also have a microphone. When the display housing 20 and the keypad housing 30 are joined with each other, the microphone of the keypad housing 30 is operated instead of the microphone 205 of the display housing 20. A telephone conversation is carried out using the speaker 204 of the display housing 20 and the microphone of the keypad housing 30. Therefore, the microphone and the speaker are distanced from each. This enhances privacy.

In the above embodiment, the control unit 310 provides the image data acquired by the imaging unit 305 to the control unit 210 via the local communication IF units 212 and 312 in the separated imaging mode. The control unit 210 then displays the image on the display unit 201. In this case, the control unit 310 may reduce the amount of data provided to the display housing 20 by reducing or compressing the image data acquired by the imaging unit 305. When receiving a recording instruction, the control unit 310 stores image data having a satisfactory image quality in the data storage means. This reduces the data communication amount and lowers the load.

In the above embodiment, the data storage means for storing the image data is arranged in the control unit 310 of the keypad housing 30. However, the location of the data storage means is not limited. For example, the data storage means may be located in the display housing 20.

In the above embodiment, the control units 210 and 310 each execute the charging amount checking process, and the control unit 310 executes the charge ratio comparison process. The body executing each process is not limited in such a manner. For example, a process may be executed by a control means in the cell phone device 10.

The present examples and embodiments are to be considered as illustrative and not restrictive, and the invention is not to be limited to the details given herein, but may be modified within the scope and equivalence of the appended claims.

What is claimed is:

1. A cell phone device comprising:
   a first housing; and
   a second housing separable from the first housing;
   wherein the first housing includes a display means, an imaging operation means, a first local communication means, a first battery and a first control means;
   the second housing includes an imaging means, a second local communication means, a second battery and a second control means;
   the second control means transmits image data generated by the imaging means to the first local communication means via the second local communication means and outputs the image to the display means; and
   the first control means records the image data generated by the imaging means based on an imaging instruction input to the imaging operation means,
   wherein the first control means acquires a charge state of the first battery, the second control means acquires a charge state of the second battery, and a charge ratio of the first and second batteries is calculated and when the first and second housings are connected, power is drawn from the battery with the greater charge until the batteries have substantially the same charge, and when the first and second batteries are being charged precedence is given to the battery with a weaker charge.

2. The cell phone device according to claim 1, wherein the second housing includes a data storage means, and wherein when the imaging instruction is input to the imaging operation means, the first control means transmits a recording instruction to the second local communication means via the first local communication means to record the image data generated by the imaging means on the data storage means of the second housing.

3. The cell phone device according to claim 1, wherein:
   the first housing includes a voice output means and a voice input means;
   the second housing includes a public network communication means for performing communication with a base station of a cell phone network; and
   the second control means transfers a call received from the base station by the public network communication means to the first local communication means via the second local communication means to enable conversation using the voice output means and the voice input means.

4. The cell phone device according to claim 1, wherein:
   when the first and second housings are connected to each other, the charge ratio of the first battery and the charge ratio of the second battery are maintained to be substantially the same.

* * * * *